(12) United States Patent
Zhang et al.

(10) Patent No.: US 9,924,515 B2
(45) Date of Patent: Mar. 20, 2018

(54) DYNAMIC SELECTION OF POWER REDUCTION VALUES

(71) Applicant: Apple Inc., Cupertino, CA (US)

(72) Inventors: Dawei Zhang, Saratoga, CA (US); Huarui Liang, Beijing (CN); Tarik Tabet, San Jose, CA (US); Farouk Belghoul, Campbell, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 14/661,543

(22) Filed: Mar. 18, 2015

(65) Prior Publication Data

US 2015/0271824 A1 Sep. 24, 2015

Related U.S. Application Data

(60) Provisional application No. 61/955,173, filed on Mar. 18, 2014.

(51) Int. Cl.
| | | |
|---|---|---|
| *H04W 72/04* | (2009.01) | |
| *H04W 52/36* | (2009.01) | |
| *H04W 52/14* | (2009.01) | |
| *H04W 52/16* | (2009.01) | |

(52) U.S. Cl.
CPC ..... *H04W 72/0453* (2013.01); *H04W 52/367* (2013.01); *H04W 52/146* (2013.01); *H04W 52/16* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2014/0056228 A1* | 2/2014 | Krishnamurthy | ..... | H04W 52/10 370/328 |
| 2014/0092838 A1* | 4/2014 | Coan | ..... | H04W 52/327 370/329 |
| 2014/0126440 A1* | 5/2014 | Frank | ..... | H04W 52/06 370/311 |
| 2015/0049726 A1* | 2/2015 | Lim | ..... | H04W 72/0453 370/329 |
| 2015/0063266 A1* | 3/2015 | Lim | ..... | H04W 72/0453 370/329 |

(Continued)

*Primary Examiner* — Suk Jin Kang
(74) *Attorney, Agent, or Firm* — Downey Brand LLP (57) ABSTRACT

A method for dynamically selecting an A-MPR value to apply for an uplink transmission is provided. The method can include a wireless communication device receiving an indication from a network that A-MPR should be applied for uplink transmissions within a frequency band used for communication between the wireless communication device and the network. The method can further include the wireless communication device receiving an RB allocation for a subset of RB's within the frequency band from the network. The method can additionally include the wireless communication device determining an allocation ratio and a distribution characteristic of the allocated subset of RB's within the frequency band. The method can also include the wireless communication device selecting an A-MPR value to apply based at least in part on the allocation ratio and the distribution characteristic. The method can further include the wireless communication device applying the selected A-MPR.

20 Claims, 7 Drawing Sheets

(56) References Cited

U.S. PATENT DOCUMENTS

| | | | |
|---|---|---|---|
| 2015/0111608 A1* | 4/2015 | Kazmi | H04W 52/18 455/522 |
| 2015/0208346 A1* | 7/2015 | Piipponen | H04W 52/36 455/574 |
| 2015/0230254 A1* | 8/2015 | Lim | H04W 72/0453 370/329 |
| 2015/0245302 A1* | 8/2015 | Lim | H04W 52/34 455/522 |
| 2015/0289215 A1* | 10/2015 | Kaukovuori | H04W 52/146 370/329 |
| 2015/0304962 A1* | 10/2015 | Fabien | H04W 52/247 370/329 |
| 2016/0088569 A1* | 3/2016 | Frank | H04W 52/06 455/522 |
| 2016/0262171 A1* | 9/2016 | Tejedor | H04W 72/1226 |
| 2016/0270008 A1* | 9/2016 | Kazmi | H04W 52/34 |

* cited by examiner

DYNAMIC SELECTION OF POWER REDUCTION VALUES

CROSS-REFERENCE TO RELATED APPLICATIONS

This application claims the benefit of U.S. Provisional Application No. 61/955,173, entitled "DYNAMIC SELECTION OF AN A-MPR VALUE," by Zhang et al., filed on Mar. 18, 2014, the content of which is hereby incorporated by reference in its entirety for all purposes.

FIELD

The described embodiments relate generally to wireless communications technology. More particularly, the present embodiments relate to dynamic selection by a wireless communication device of power reduction values, such as an Additional Maximum Power Reduction (A-MPR) value, to apply to an uplink transmission.

BACKGROUND

Wireless communication devices can be required to meet "additional" or "supplemental" spectrum emission requirements in addition to "basic" or "general" spectrum emission requirements that can be applied by a wireless communication device in certain operating conditions. In this regard, additional spectrum emission requirements can be required in deployment scenarios in which an adjacent radio frequency band can be particularly sensitive to radio frequency spectrum emissions by a wireless communication device. For example, additional spectrum emission requirements can be applied in adjacent band deployment scenarios in which communication between a wireless communication device and serving wireless network is provided by a radio frequency band that is adjacent to a radio frequency band that has tight spectrum emission requirements, such as in the case where a cellular radio frequency band is adjacent to a "Public Safety" radio frequency band. As a particular example of such a scenario, Radio Frequency Band 13, used by Verizon Wireless® for Long Term Evolution (LTE) deployment in the United States, is adjacent to a Public Safety Radio Frequency Band, and devices operating in Radio Frequency Band 13 can be subject to additional spectrum emission requirements.

Application of additional spectrum emission requirements reduces the uplink transmission power of a wireless communication device, thereby reducing the uplink link budget of the wireless communication device. In severe cases, the reduction in uplink link budget can reduce the effective uplink coverage area of a serving cell in which the wireless communication device operates to the extent that the wireless communication device can suffer call drops and loss of service. However, in many cases, the transmission power back off applied by a wireless communication device to satisfy an additional spectrum emission requirement is greater than necessary, as current devices apply an A-MPR back off value sufficient to satisfy a worst case scenario rather than being based on an actually existing scenario for the wireless communication device.

SUMMARY

Exemplary embodiments provide a wireless communication device configured to dynamically select an A-MPR value to apply to an uplink transmission in situations in which additional spectrum emission requirements must be satisfied. More particularly, the wireless communication device, in some embodiments, is configured to consider a distribution characteristic of an allocated subset of Resource Blocks (RB's) to be used for an uplink transmission in addition to an allocation ratio of the allocated subset of RB's when selecting an A-MPR value to apply to comply with additional spectrum emission requirements. In this regard, considering only the allocation ratio when selecting the A-MPR value can account for a worst-case scenario, i.e., can provide an A-MPR value that satisfies any distribution of the allocated RB's, including those that can result in the highest level of out-of-band spectrum emissions, e.g., when concentrating a high level of radio frequency energy in RB's near a radio frequency band edge adjacent to a radio frequency band that can require minimal levels of radio frequency interference. The actual radio frequency spectrum leakage into adjacent radio frequency bands, however, can be affected by the location of allocated RB's within a radio frequency band (e.g., the distribution of the allocated RB's across a radio frequency channel bandwidth). As such, some embodiments include selection of an A-MPR value appropriate for an actual uplink radio frequency transmission scenario, e.g., by evaluating the distribution of the allocated RB(s) within the radio frequency band. Accordingly, in many cases, a lower amount of back off can be applied to the uplink radio frequency transmissions on the allocated RB's when accounting for the actual distribution of allocated RB's rather than only assuming a "worst case" scenario, thereby improving the uplink transmission's link budget and reducing incidences of call drops and other communication service losses that can occur with lower and/or inadequate uplink transmission levels.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Radio frequency transmissions, particularly within regulated radio frequency bands, by wireless communication devices can be required to limit an amount of radio frequency spectrum both within a particular radio frequency band in which the radio frequency transmissions occur and within adjacent radio frequency bands in which radio frequency leakage from the transmissions can result in radio frequency interference for reception of signals by the same wireless communication device or by other wireless communication devices. Some particular radio frequency bands, such as those used for public safety (police, fire department, emergency medical, special emergency, etc.), may require modified radio frequency spectrum masks that additionally limit radio frequency spectrum emissions from wireless communication devices that operate in radio frequency bands adjacent to or otherwise may cause interference in the particular radio frequency bands. Because uplink transmissions from a wireless communication device to a cellular wireless network are controlled using allocations of radio resource blocks (RB's) provided by the wireless network to the wireless communication device dynamically, the amount of potential radio frequency interference can vary with different allocations of RB's. An allocation of RB's that uses frequencies at or near an edge of the radio frequency band, particularly when transmitted at or near maximum transmission levels, can interference more than an allocation of RB's that concentrates the uplink transmission in the middle of the radio frequency band. As described further herein, a wireless communication device can account for a particular RB allocation and/or one or more RB allocation distribution characteristics of the particular RB allocation to determine an amount of uplink transmission power adjustment to apply for uplink transmissions that use the particular RB allocation. In some embodiments, the wireless communication device includes a memory in which an association between transmission adjustment levels, such as an additional maximum power reduction (A-MPR) values, and RB allocations and/or RB allocation distribution characteristics. In some embodiments, the association is stored in one or more tables and/or sub-tables within a table in the memory of the wireless communication device. In some embodiments, different tables, sub-tables, or other data structures can include associations between A-MPR values and RB allocations and/or RB allocation distribution characteristics based on different radio frequency bands in use and/or on a location in which the wireless communication device operates, e.g., different requirements for different radio frequency bands in different geographic areas. In some embodiments, the wireless network can transmit messages that can indicate a particular one or set of general and/or additional radio frequency spectrum emission masks to apply to uplink transmissions. In some embodiments, the messages include a network signaling (NS) value that can be used in combination with RB allocation and/or RB allocation distribution characteristics to determine an A-MPR value for uplink transmissions by the wireless communication device while operating in the wireless network. In some embodiments, the A-MPR value is selected by the wireless communication device to satisfy additional radio frequency emission requirements that correspond to the NS value received from the wireless network.

Figure 1:
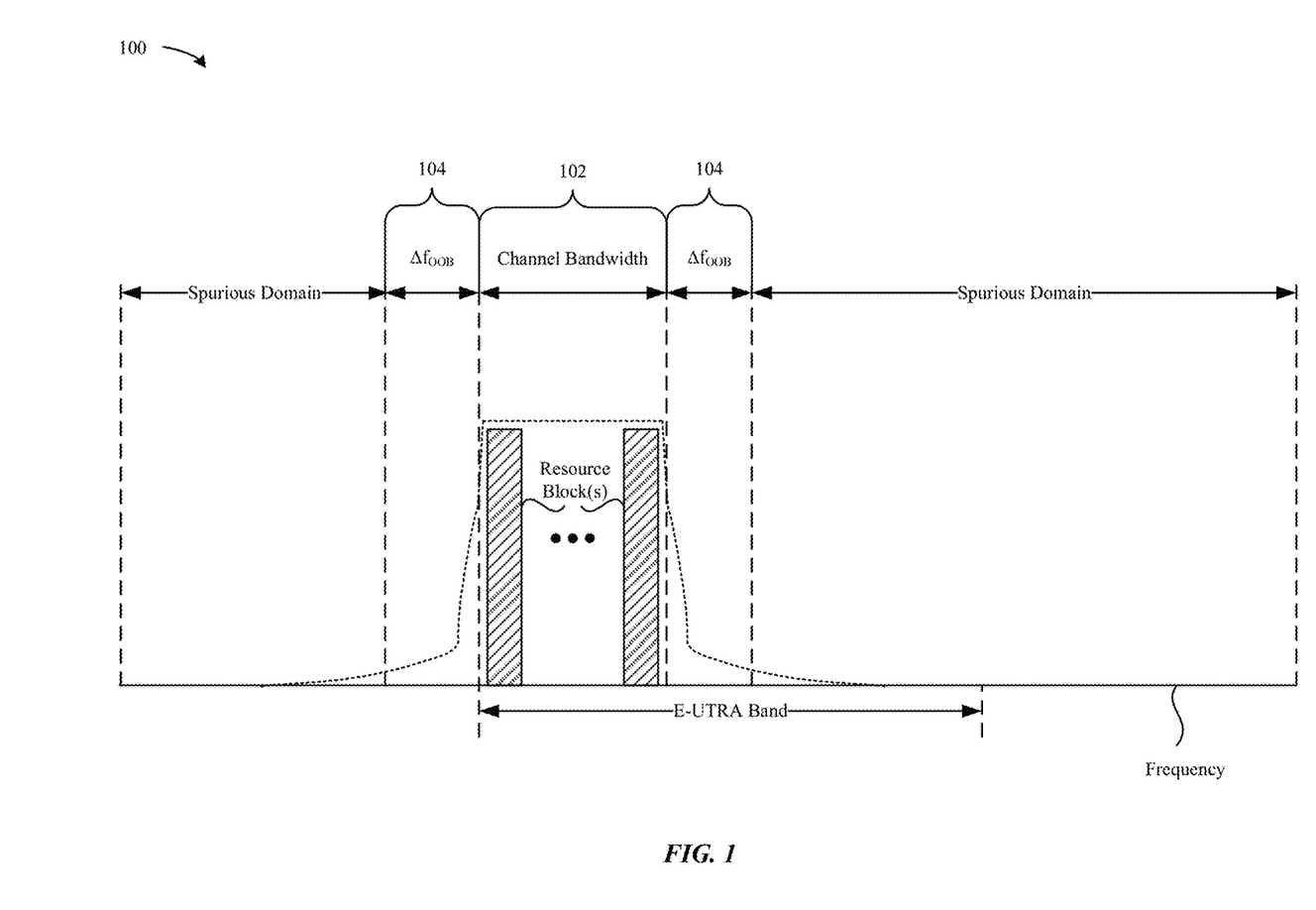
FIG. 1 illustrates an uplink transmission radio frequency spectrum emission scenario for which additional spectrum emission requirements can be enforced, in accordance with some embodiments.

FIG. 1 illustrates a diagram 100 of an uplink transmission radio frequency spectrum emission scenario for which additional spectrum emission requirements can be enforced. In the representative scenario illustrated by the diagram 100 of FIG. 1, uplink transmissions can be communicated using on one or more resource blocks (RB's) within a channel bandwidth 102. Uplink transmissions within the channel bandwidth 102 can result in spectrum emissions in radio frequency bands adjacent to the channel bandwidth 102. Radio frequency interference from the spectrum emissions that occur outside of the channel bandwidth 102 can be particularly impactful within the out-of-band (OOB) radio frequency ranges, such as those indicated as $\Delta f_{oob}$ frequency ranges 104 in FIG. 1, adjacent to the channel bandwidth 102. In this regard, the $\Delta f_{oob}$ frequency ranges 104 can include transition frequencies in which the radio frequency spectrum in the channel bandwidth 102 contributes some radio frequency leakage (e.g., due to limited filtering of higher order harmonics) such that uplink radio frequency transmission within the channel bandwidth 102 does not actually "zero out" at the edges of the channel bandwidth 102. The frequency range (e.g., the width of the radio frequency spectrum) of the $\Delta f_{oob}$ frequency ranges 104 can vary depending on the extent (e.g., 1.5 MHz, 3 MHz, 5 MHz, etc.) of the channel bandwidth 102 occupied by the uplink radio frequency transmissions. While radio frequency spectrum emissions can additionally occur in radio frequency ranges outside of the $\Delta f_{oob}$ frequency ranges 104, e.g., in ranges indicated as spurious domains in FIG. 1, general spectrum emission requirements and additional spectrum emission requirements usually apply to radio frequency transmissions within the channel bandwidth 102 in order to mitigate radio frequency interference within the $\Delta f_{oob}$ frequency ranges 104.

General spectrum emission requirements can be applied by wireless communication devices operating in wireless networks using various radio access technologies (RAT's) to reduce uplink radio frequency transmit power levels within the channel bandwidth 102 as needed to satisfy the general spectrum emission requirements so as to at least partially mitigate radio frequency interference levels within $\Delta f_{oob}$ frequency ranges 104 adjacent to the channel bandwidth 102. For example, in Evolved Universal Terrestrial Radio Access Network (eUTRAN) systems, such as wireless networks implementing an LTE RAT, a "Maximum Power Reduction" (MPR) adjustment of uplink transmit power can be used to meet a General Spectrum Emission Mask to mitigate radio frequency leakage into adjacent radio frequency bands, thereby reducing levels of radio frequency interference with wireless communication devices that operate in the $\Delta f_{oob}$ frequency ranges 104 adjacent to the channel bandwidth 102 in which the uplink transmissions are concentrated. An example General Spectrum Emission Mask that can be applied in eUTRAN systems can be specified as follows in Table 1. The General Spectrum Emission Mask summarized in Table 1 includes a resolution bandwidth to use to determine compliance and values for maximum radio frequency spectrum levels in various $\Delta f_{oob}$ frequency ranges 104 adjacent to the channel bandwidth 102 based on the width of the channel bandwidth 102. For example, when the channel bandwidth 102 spans a radio frequency range of 20 MHz, the out-of-band spectrum emissions measured in the $\Delta f_{oob}$ frequency ranges 104 immediately adjoining the channel bandwidth 102 and up to 1 MHz away must not exceed −21 dBm, while the $\Delta f_{oob}$ frequency ranges 104 between 1 MHz and 2.5 MHz away from band edges of the channel bandwidth 102 must not exceed −10 dBm. As illustrated by the values in Table 1, channel bandwidth 102 values can require more out-of-band radio frequency spectrum emission reduction than narrower channel bandwidth 102 values, particularly in $\Delta f_{oob}$ frequency ranges 104 immediately adjacent to the channel bandwidth 102.

TABLE 1

Spectrum Emission Limit (dBm)/Channel Bandwidth

| $\Delta f_{oob}$ (MHz) | 1.4 MHz | 3.0 MHz | 5 MHz | 10 MHz | 15 MHz | 20 MHz | Measurement Bandwidth |
|---|---|---|---|---|---|---|---|
| ±0-1 | −10 | −13 | −15 | −18 | −20 | −21 | 30 kHz |
| ±1-2.5 | −10 | −10 | −10 | −10 | −10 | −10 | 1 MHz |
| ±2.5-2.8 | −25 | −10 | −10 | −10 | −10 | −10 | 1 MHz |
| ±2.8-5 | | −10 | −10 | −10 | −10 | −10 | 1 MHz |
| ±5-6 | | −25 | −13 | −13 | −13 | −13 | 1 MHz |
| ±6-10 | | | −25 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

In certain scenarios, such as when operating a wireless communication device that transmits in a radio frequency band adjacent to a Public Service Band and/or another adjacent radio frequency band that can be particularly sensitive to radio frequency leakage into the $\Delta f_{oob}$ frequency ranges 104, a serving wireless network can require a wireless communication device to meet "additional" spectrum emission requirements that can require the wireless communication device to further limit its uplink transmission power, e.g., beyond a level of output power reduction applied for "normal" operation, (e.g., power reduction in accordance with general spectrum emission requirements). The additional spectrum emission requirement can limit the uplink transmissions of the wireless communication device within the channel bandwidth 102 to further reduce radio frequency leakage into the $\Delta f_{oob}$ frequency ranges 104 beyond those specified by the general spectrum emission requirements. For example, in eUTRAN systems, an Additional Maximum Power Reduction (A-MPR) value can be used to meet an Additional Spectrum Emission Mask, which can be applied supplemental to a General Spectrum Emission Mask.

A wireless network can trigger a wireless communication device to apply an A-MPR value by signaling a Network Signaling (NS) value, which can be denoted as "NS_xx" to the wireless communication device. For example, an NS value can be signaled to the wireless communication device via Radio Resource Control (RRC) signaling. The "xx" in the NS value represents a variable, which can be used by the wireless network to define which Additional Spectrum Emission Mask to apply. The signaled NS value can vary based on a geographic region and a radio frequency band being used. For example, a given radio frequency band in the United States can be associated with a particular Additional Spectrum Emission Mask, and thus a particular NS value, which can differ from another particular Additional Spectrum Emission Mask, and thus another particular NS value, associated with the same radio frequency band in Japan, e.g., due to different arrangements of radio frequency spectrum allocation in the two geographic regions. A representative General Spectrum Emission Mask that can be applied for NS_03, NS_11, NS_20, and NS_21 in eUTRAN systems can be specified as follows in Table 2.

TABLE 2

Spectrum Emission Limit (dBm)/Channel Bandwidth

| $\Delta f_{oob}$ (MHz) | 1.4 MHz | 3.0 MHz | 5 MHz | 10 MHz | 15 MHz | 20 MHz | Measurement Bandwidth |
|---|---|---|---|---|---|---|---|
| ±0-1 | −10 | −13 | −15 | −18 | −20 | −21 | 30 kHz |
| ±1-2.5 | −13 | −13 | −13 | −13 | −13 | −13 | 1 MHz |
| ±2.5-2.8 | −25 | −13 | −13 | −13 | −13 | −13 | 1 MHz |
| ±2.8-5 | | −13 | −13 | −13 | −13 | −13 | 1 MHz |
| ±5-6 | | −25 | −13 | −13 | −13 | −13 | 1 MHz |
| ±6-10 | | | −25 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

An A-MPR value can be defined in decibels (dB) and as a function of an RB allocation ratio, which can be defined as the number of RB's used (e.g., the number of RB's allocated for use by the wireless network to the wireless communication device during one or more transmission time intervals) over the total number of RB's available for transmission in the radio frequency band, such as the channel bandwidth 102, for communication between the wireless communication device and the wireless network. In LTE systems, each RB can occupy a radio frequency bandwidth of 180 kHz. As such, the total number of RB's available for uplink transmission by the wireless communication device can vary with the channel bandwidth 102. For example, when the channel bandwidth 102 spans 1.4 MHz, there can be a total of 6 RB's across the channel bandwidth 102. When a 20 MHz wide radio frequency band is being used, there can be a total of 100 RB's. Thus, for example, when a wireless communication device uses a 20 MHz wide radio frequency band and 20 RB's are allocated for use by the wireless communication device, the allocation ratio can equal: 20/100=0.2.

The Third Generation Partnership Project (3GPP) defines A-MPR as a maximum allowed "additional" maximum transmission power level reduction for a fixed RB allocation ratio. A wireless network can communicate the A-MPR value to the wireless communication device using control messages, such as broadcast system information block (SIB) messages. Wireless communication devices apply an A-MPR value that takes into account a "worst case" RB distribution scenario for any given RB allocation ratio, thereby applying the largest possible transmit power back off regardless of the actual distribution of allocated RB's within the radio frequency band. In this regard, radio frequency spectrum emissions, such as occurring in the $\Delta f_{oob}$ frequency ranges 104, can vary not just based on the RB allocation ratio used, but also based on how the allocated RB's are distributed within the radio frequency band. For example, given a first RB allocation scenario, in which an allocated RB, which is closest to a band edge of the radio frequency band, is closer to the band edge than the closest allocated RB is to the band edge in a second RB allocation scenario, the radio frequency leakage into the adjacent radio frequency band, and thus, the required A-MPR value to satisfy the applicable Additional Spectrum Emission Mask in the first RB allocation scenario can be higher than in the second RB allocation scenario. Thus, when using a total of ten RB's in a radio frequency band that has a total of 100 available RB's (i.e., a 10/100=0.1 RB allocation ratio), a smaller transmit power back off would be required when using 10 RB's in the middle of the radio frequency band (further away from the band edges) than when using 10 RB's adjacent to (or nearer to) the band edges of the radio frequency band. As another example, radio frequency spectrum emission levels can vary depending on a distribution pattern of the allocated RB's, which can be characterized in part by a total radio frequency spectrum bandwidth occupancy that can vary depending on the distribution pattern of the allocated RB's. For example, the allocated RB's can be entirely contiguous in frequency, or can include non-contiguous clusters containing one or more RB's, with each non-contiguous cluster being separated in frequency by one or more unused RB's. Thus, by applying a static A-MPR value corresponding to a worst case RB allocation scenario for a given RB allocation ratio, wireless communication devices can limit their uplink link budget unnecessarily that an actually required to satisfy the applicable Additional Spectrum Emission Mask.

Figure 2:
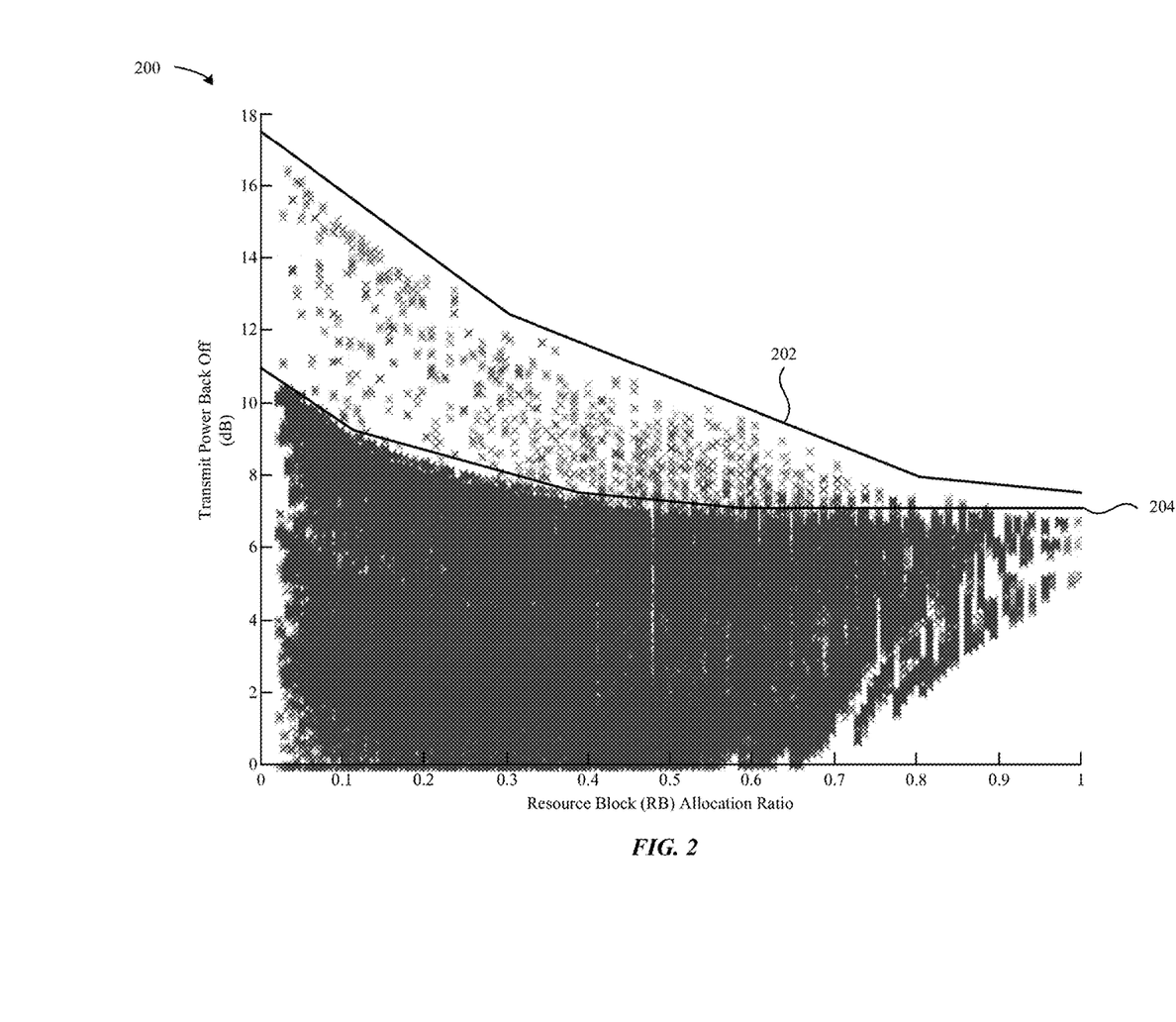
FIG. 2 illustrates a graph of data from a simulation modeling actual A-MPR values required to meet additional spectrum emission requirements for different RB allocation scenarios in an evolved Universal Terrestrial Radio Access Network (eUTRAN), in accordance with some embodiments.

FIG. 2 illustrates a graph 200 of data from a simulation modeling "actual" A-MPR values required to meet additional radio frequency spectrum emission requirements for a variety of RB allocation scenarios in an evolved Universal Terrestrial Radio Access Network (eUTRAN). In particular, the graph 200 of FIG. 2 illustrates A-MPR values for a CA_39C scenario, in which two radio frequency channels cumulatively occupying a total of 40 MHz of radio frequency bandwidth, such as for an allocation in which a first radio frequency channel has a 20 MHz radio frequency bandwidth and a second radio frequency channel has a radio frequency bandwidth up to 20 MHz (e.g., 5, 10, 20, or other bandwidth) can be used.

The graph 200 of FIG. 2 illustrates a required transmission power back off (measured in decibels) on the Y-axis for each possible RB distribution scenario for respective RB allocation ratios indicated on the X-axis. A "worst-case" transmit power back off value for each RB allocation ratio is represented by a first curve fit line 202. Prior wireless communication devices can apply a fixed A-MPR value that corresponds to the first curve fit line 202 for each respective RB allocation ratio. As illustrated by the graph 200 of FIG. 2, however, the A-MPR values corresponding to the first curve fit line 202 for the worst-case scenario penalizes transmission power more than needed in many cases. For example, with low RB allocation ratio values, such as approaching a "zero" RB allocation ratio value, the worst-case scenario illustrated by the first curve fit line 202 applies an 18 dB A-MPR value, while in reality the transmit power back off needed ranges from 0 dB to 18 dB depending on the distribution of the allocated RB's within the radio frequency band. As another example, which can be seen from the graph 200 of FIG. 2, with an RB allocation ratio of 0.1, the worst case scenario applies an A-MPR of approximately 16 dB, while in most cases, an A-MPR of somewhere between 9 and 10 dBs would suffice. In a limited number of cases, an A-MPR exceeding 10 dB can be required for an RB allocation ratio of 0.1, but the vast majority of cases do not require A-MPR levels that exceed 10 dB, for an RB allocation ratio of 0.1. Accordingly, the application of the worst-case A-MPR, as defined by the first curve fit line 202, is excessive in many, if not most, cases, which leads to a significant reduction in uplink transmission power levels that impact the uplink link budget and restrict uplink coverage with prior wireless communication devices.

Some example embodiments address the deficiencies of excessive transmission power back off resulting from prior approaches that apply a worst-case A-MPR to determine an uplink transmit power reduction based solely on an RB allocation ratio, e.g., by dynamically selecting an A-MPR value to satisfy an Additional Spectrum Emission Mask based on one or more distribution characteristics of the RB allocation in combination with the RB allocation ratio. For example, some embodiments maintain a data structure, such as a lookup table that defines a set of respective A-MPR values and RB distribution characteristic combinations. Accordingly, given an actual combination of an RB allocation ratio and an RB distribution characteristic of the RB allocation, the wireless communication device of such example embodiments can obtain, e.g., using the lookup table, an associated A-MPR from the data structure and apply the associated A-MPR based on the RB distribution characteristic in addition to the RB allocation ratio. As illustrated and described with respect to FIG. 2, this "dynamic" A-MPR selection can result in less uplink transmit power reduction in many cases, thereby improving the link budget for uplink transmission by the wireless communication device and increasing the effective uplink coverage range of a cell. Wireless communication devices and users thereof can accordingly experience reduced incidences of call drops and loss of service.

These and other embodiments are discussed below with reference to FIGS. 3 to 6. However, those skilled in the art will readily appreciate that the detailed description given herein with respect to these Figures is for explanatory purposes only and should not be construed as limiting.

Figure 3:
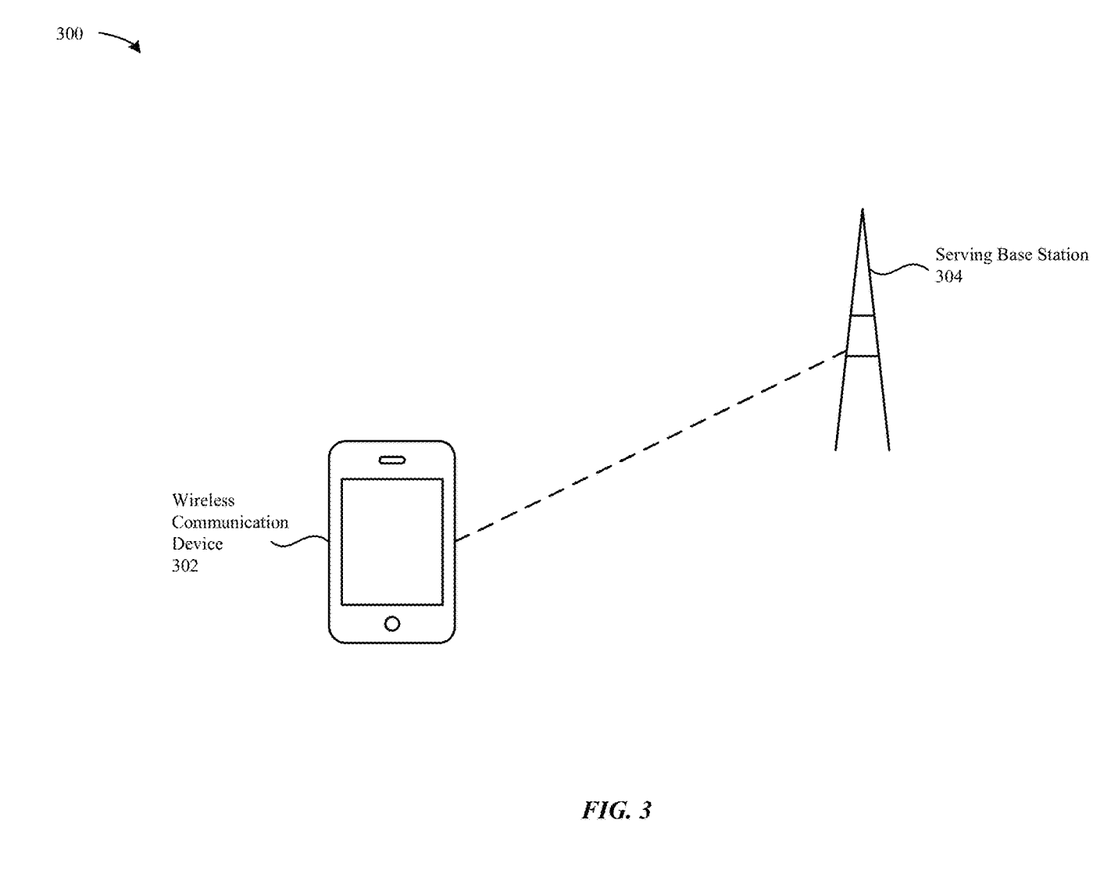
FIG. 3 illustrates a representative wireless communication system, in accordance with some embodiments.

FIG. 3 illustrates a representative wireless communication system 300 in which some example embodiments can be applied. The wireless communication system 300 can include a wireless communication device 302, which can, for example, comprise a cellular phone, such as a smart phone device, a tablet computing device, a laptop computer, or other computing device that can be configured to communicate over a cellular wireless network and/or other wireless network.

The wireless communication device 302 can be camped on a serving base station 304 of a serving cellular wireless network. The serving base station 304 can be any type of cellular base station that uses a radio access technology (RAT) used by the serving cellular wireless network. By way of non-limiting example, the serving base station 304 can be a base station (BS), a base transceiver station (BTS), a node B, an evolved Node B (eNB), some combination thereof, and/or another type of cellular base station. The RAT used by the serving cellular wireless network can be any type of RAT that can use a radio frequency band for which an additional spectrum emission requirement can be applied. By way of non-limiting example, the wireless communication system 300 can use an LTE RAT, such as any existing or future release of an LTE/LTE-Advanced (LTE-A) wireless communication protocol specified by 3GPP. It will be appreciated, however, that various embodiments disclosed herein are not limited to application within LTE wireless networks, and where example embodiments are described within the context of LTE wireless networks, it will be appreciated that those techniques, methods, apparatuses, and computer program products can be applied mutatis mutandis within wireless networks using a RAT other than LTE for which an additional spectrum emission requirements can be applied. Likewise, embodiments described within the context of an A-MPR are also provided by way of example and not by way of limitation, such that examples described within the context of selection and application of an A-MPR value can likewise be applied mutatis mutandis to the selection and application of other forms of additional transmit power reduction that can be applied to meet additional radio frequency spectrum emission requirements within the scope of the disclosure.

Figure 4:
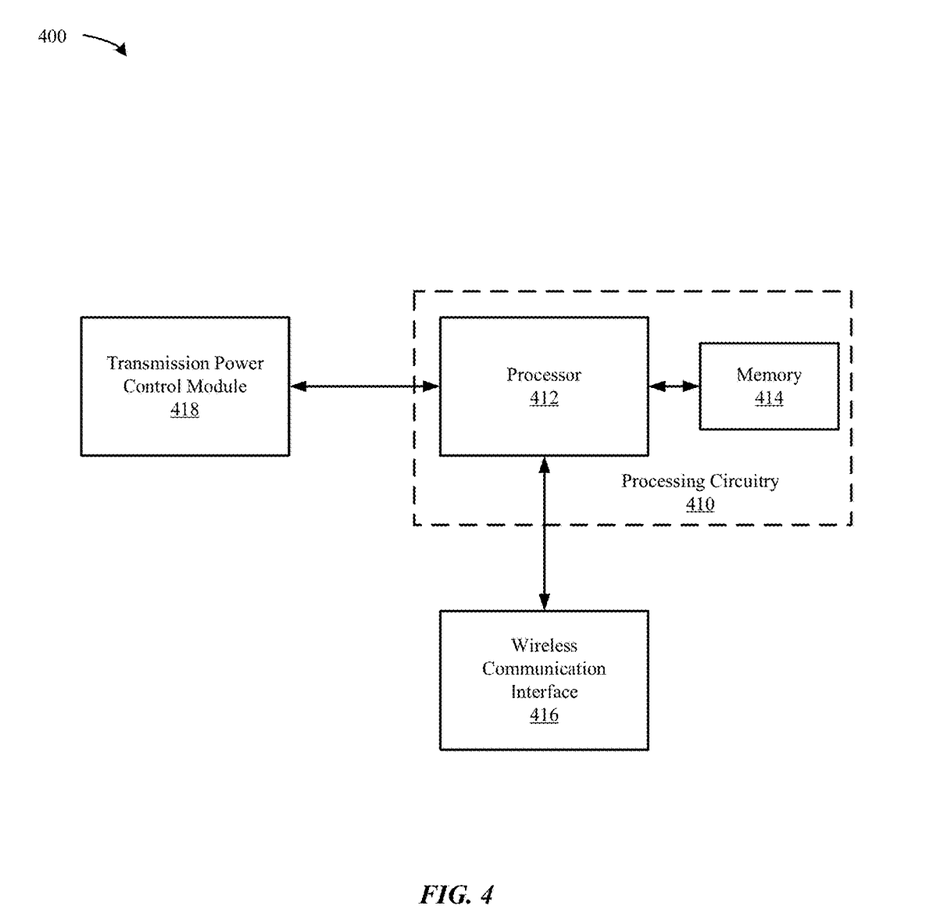
FIG. 4 illustrates a block diagram of an apparatus that can be implemented on a wireless communication device, in accordance with some embodiments.

FIG. 4 illustrates a block diagram of an apparatus 400 that can be implemented on a wireless communication device, such as wireless communication device 302, in accordance with some example embodiments. In this regard, when implemented on a computing device, such as wireless communication device 302, apparatus 400 can enable the computing device to operate within the wireless communication system 300 and to dynamically select and apply an A-MPR value for uplink transmissions sent to the serving base station 304 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the wireless communication device 302, in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, each of which can include one or more chips. The processing circuitry 410 and/or one or more further components of the apparatus 400 can therefore, in some instances, be configured to implement an embodiment on a chipset. In some example embodiments in which one or more components of the apparatus 400 are embodied as a chipset, the chipset can be capable of enabling a computing device to operate within a wireless communication system, such as wireless communication system 300, when implemented on or otherwise operably coupled to the computing device. In some example embodiments, the apparatus 400 can include a cellular baseband chipset, which can be configured to enable communication between a computing device, such as wireless communication device 302, and a cellular wireless network.

In some example embodiments, the processing circuitry 410 can include a processor 412 and, in some embodiments, such as that illustrated in FIG. 4, can further include memory 414. The processing circuitry 410 can communicate with or otherwise control the wireless communication interface 416 and/or transmission power control module 418.

The processor 412 can be embodied in a variety of forms. For example, the processor 412 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the apparatus 400 as described herein. In some example embodiments, the processor 412 can be configured to execute instructions that can be stored in the memory 414 or that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable medium that can store instructions that can be executed by the processor 412. In this regard, the memory 414 can be configured to store information, data, applications, instructions and/or the like for enabling the apparatus 400 to carry out various functions in accordance with one or more example embodiments. In some embodiments in which the apparatus 400 comprises a cellular baseband chipset, the memory 414 can comprise memory implemented on the cellular baseband chipset. In some embodiments, the memory 414 can be in communication with one or more of the processor 412, wireless communication interface 416, or transmission power control module 418 via one or more busses for passing information among components of the apparatus 400.

The apparatus 400 can further include a wireless communication interface 416. The wireless communication interface 416 can enable the apparatus 400 to send wireless signals to and receive signals from one or more wireless networks. Thus, for example, when implemented on wireless communication device 302, the wireless communication interface 416 can be configured to support a connection to a base station, such as serving base station 304. The wireless communication interface 416 can additionally include one or more transceivers and/or other radio frequency components to support one or more further wireless communication technologies that can be implemented on a wireless communication device 302. For example, the wireless communication interface 416 can include radio frequency components for supporting communication via Wi-Fi, Bluetooth, and/or other ISM band communications technology.

The apparatus 400 can further include transmission power control module 418. The transmission power control module 418 can be embodied as various means, such as circuitry, hardware, a computer program product comprising a non-transitory computer readable medium (for example, the memory 414) storing computer readable program instructions that are executable by a processing device (for example, the processor 412), or some combination thereof. In some embodiments, the processor 412 (or the processing circuitry 410) can include, or otherwise control the transmission power control module 418. The transmission power control module 418 can be configured to select an A-MPR (and/or other power back off) value to apply to uplink transmissions to satisfy an additional radio frequency spectrum emission requirement in accordance with various example embodiments. Thus, for example, the transmission power control module 418 of some example embodiments can be configured to select an A-MPR value to apply to uplink transmissions sent via the wireless communication interface 416 in an uplink direction to a wireless network based at least in part on one or more distribution characteristics of an RB allocation provided from the wireless network as described herein, such as further described below with respect to FIGS. 5A, 5B, and 6.

The transmission power control module 418 of some example embodiments can be configured to access one or more data structures defining respective A-MPR and distribution characteristic combinations to determine an A-MPR value to apply. In this regard, the transmission power control module 418 can be configured to look up a distribution characteristic(s) of an allocated subset of RB's within the radio frequency band in the data structure(s) to determine the A-MPR value associated with the actual distribution characteristic(s) of the allocated subset of RB's. For example, a data structure in accordance with some example embodiments can include a plurality of distribution characteristics for each respective RB allocation ratio. Each distribution characteristic can be associated with a respective A-MPR value. Accordingly, the transmission power control module 418 can be configured to dynamically select an A-MPR value to apply to uplink transmissions based on a combination of the RB allocation ratio and one or more distribution characteristics of the allocated subset of RB's.

It will be appreciated that any appropriate data structure that can be used to maintain relationships between RB allocation ratio and distribution characteristic combinations and their respective associated A-MPR values can be used within the scope of the disclosure. For example, in some embodiments, lookup tables can be used to maintain the data relationships.

In some example embodiments, a separate data structure and/or substructure can be used for each respective Additional Spectrum Emission Mask that can be applied by the wireless communication device 302. The transmission power control module 418, in some embodiments, can be configured to select a data structure and/or a substructure to use to determine the A-MPR value to apply based on an NS value that can be signaled to the wireless communication device 302, e.g., communicated by the serving base station 304 to the wireless communication device 302 to cause the wireless communication device 302 to apply an A-MPR value based on the NS value for uplink transmissions. In this regard, as discussed above, the NS value can be signaled by the wireless network to the wireless communication device 302 to indicate the appropriate Additional Spectrum Emission Mask that the wireless communication device 302 should be used when determining the A-MPR value to apply. The wireless communication device 302, in some embodiments, can accordingly use a data structure and/or a substructure containing A-MPR values satisfying the Additional Spectrum Emission Mask associated with the NS value signaled by the wireless network.

In some embodiments, at least a portion of the data structure(s) can be maintained locally on the wireless communication device 302, such as in memory 414. As a more particular example, in some embodiments in which the memory 414 comprises a memory implemented on a cellular baseband chipset, at least a portion of the data structure(s) can be maintained in the cellular baseband chipset memory. In some example embodiments, a manufacturer and/or vendor of the wireless communication device 302 can install the data structure(s) on the wireless communication device 302 prior to sale. As another example, a network operator can provision and/or provide an update for at least a portion of the data structure(s) to the wireless communication device 302, such as through over the air provisioning techniques. Additionally or alternatively, in some example embodiments, at least a portion of the data structure(s) can be maintained remotely on a wireless network device and can be accessed by the wireless communication device 302 over the cellular wireless network.

In some example embodiments, A-MPR values stored in a data structure can be updated in response to an update to the capabilities of the wireless communication device 302. For example, when the wireless communication device 302 is provisioned with a software update that changes transmission properties, e.g., transmission linearity improves, and/or otherwise changes the amount of radio frequency spectrum leakage outside of the radio frequency band used for wireless network communication, the A-MPR values can be adjusted to account for the change in capabilities of the wireless communication device 302.

It will be appreciated that any of a variety of RB distribution characteristics can be used as lookup keys in the data structure(s) that store the A-MPR values. In some example embodiments, the transmission power control module 418 can be configured to determine a proximity to the band edge of the closest allocated RB to the band edge. The proximity of the closest allocated RB to the band edge can be quantified using any appropriate measurement that can quantify proximity to the band edge. For example, in some embodiments, the proximity of an allocated RB to the band edge can be expressed using the number of unallocated RB slots between the allocated RB and the band edge. As another example, the proximity of an allocated RB to the band edge can be expressed in terms of an exact radio frequency bandwidth (such as in Hz or kHz) between the allocated RB and the band edge. For example, in LTE systems, the frequency bandwidth between the closest allocated RB to the band edge and the band edge can be calculated as (180 kHz)*(the number of unallocated RB slots between the band edge and the first/last allocated RB).

Figure 5A:
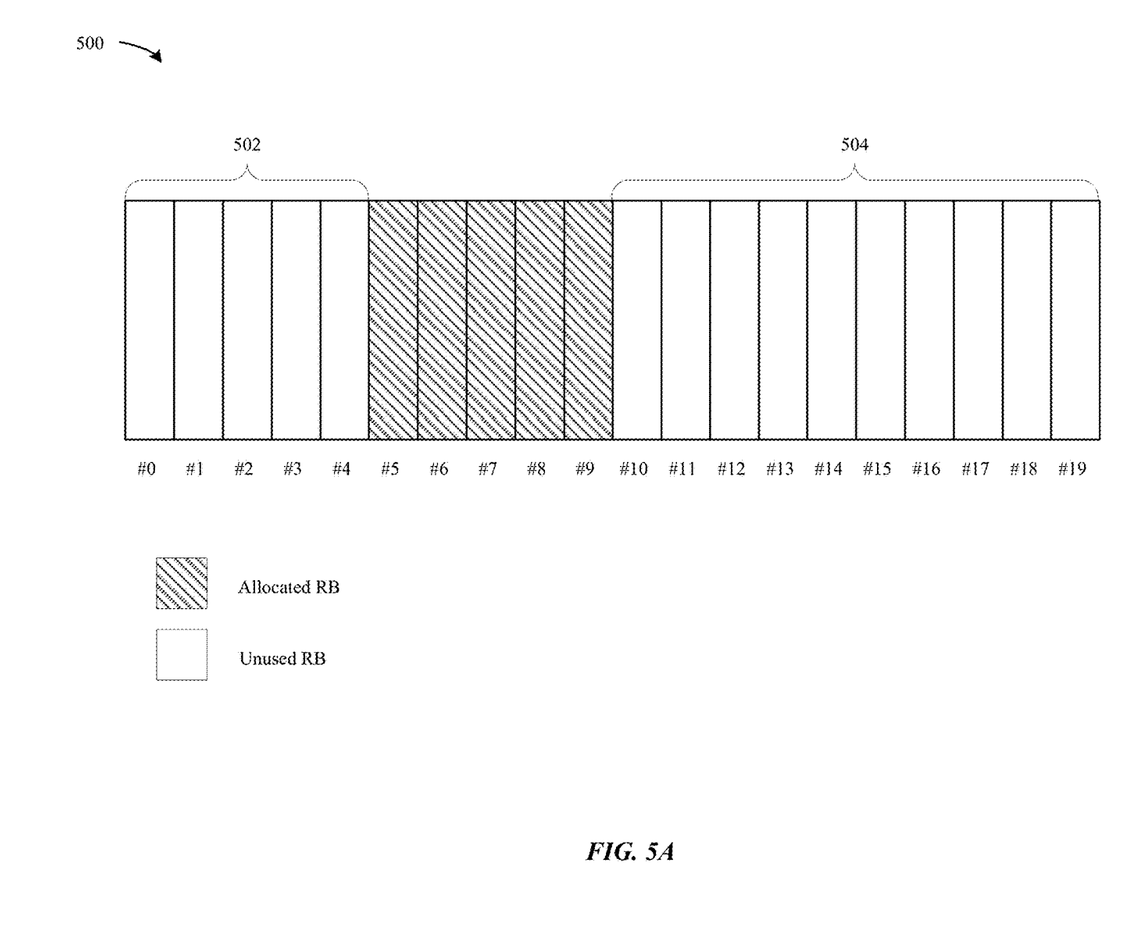
FIGS. 5A and 5B illustrate exemplary RB distribution characteristics that can be considered when selecting an A-MPR value to apply, in accordance with some embodiments.

FIG. 5A illustrates a diagram 500 for an example in which there is a total of twenty RB's, (labeled as RB #0 to RB #19), from which a contiguous block of five RB's, (labeled as RB #5 to RB #9), are allocated. The radio frequency bandwidth 502 represents the proximity of a first "closest allocated" RB (namely RB #5) to a first edge of the radio frequency band, and the radio frequency bandwidth 504 illustrates the proximity of a second "closest allocated" RB (namely RB #9) to the second edge of the radio frequency band. As the radio frequency bandwidth 502 represents a closer proximity to the band edge than the radio frequency bandwidth 504 (e.g., four RB slots for the radio frequency bandwidth 502 versus ten RB slots for the radio frequency bandwidth 504), the transmission power control module 418 of some example embodiments can look up the radio frequency bandwidth 502 (e.g., four RB slots) in combination with the RB allocation ratio (e.g., 5/20=0.25) to determine an A-MPR value to apply to uplink transmissions to meet additional radio frequency emission requirements.

In some example embodiments, the transmission power control module 418 can be additionally or alternatively configured to determine the total radio frequency spectrum bandwidth occupancy of an allocated subset of RB's within a radio frequency band. The total radio frequency spectrum bandwidth occupancy can be defined as a radio frequency bandwidth from an allocated RB closest to a first edge of the radio frequency band to an allocated RB closest to a second edge of the radio frequency band. The total radio frequency spectrum bandwidth occupancy of an allocated subset of RB's can be quantified using any appropriate measurement that can quantify a radio frequency bandwidth comprised of one or more allocated RB's. For example, in some embodiments, the total radio frequency spectrum bandwidth occupancy can be expressed by a number of RB slots, including any intervening unallocated RB slots, encompassing the radio frequency bandwidth between a first allocated RB (e.g., the allocated RB closest to the first band edge) and a last allocated RB (e.g., the allocated RB closest to the second band edge). As another example, the total radio frequency spectrum bandwidth occupancy can be expressed in terms of an exact radio frequency bandwidth. For example, in LTE systems, the radio frequency bandwidth of the total radio frequency spectrum bandwidth occupancy can be calculated as (180 kHz)*(the number of RB slots, including any intervening unallocated RB slots, encompassing the bandwidth between a first allocated RB and a last allocated RB).

Figure 5B:
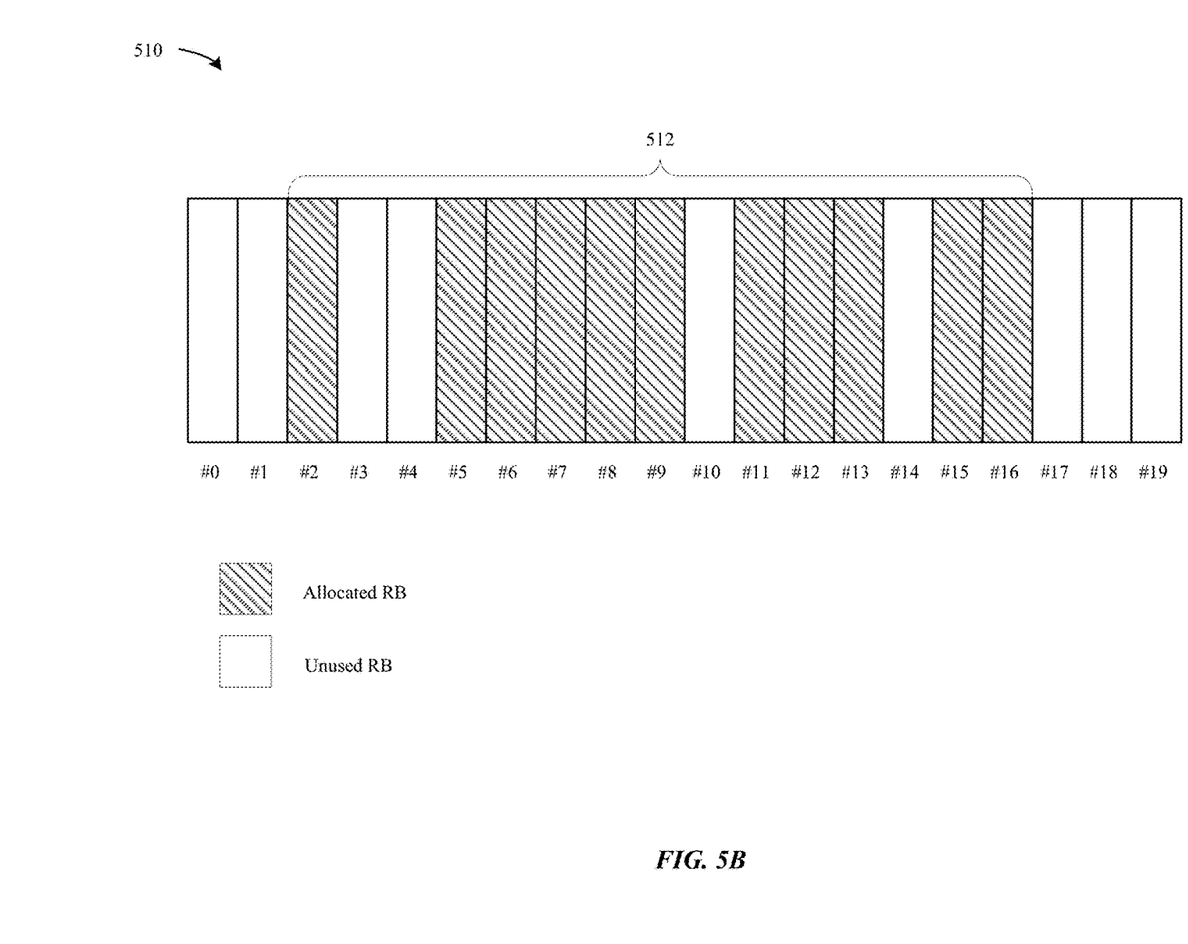

FIG. 5B illustrates a diagram 510 for determination of a total radio frequency spectrum bandwidth occupancy for an example scenario in which there are a total of twenty RB's (labeled as RB #0 to RB #19) and a non-contiguous subset of the RB's, including RB #2, RB #5 to RB #9, RB #11 to RB #13, and RB #15 to RB #16, has been allocated. The total radio frequency spectrum bandwidth occupancy for this example can be represented by the radio frequency bandwidth 512. As illustrated in FIG. 5B, the total radio frequency spectrum bandwidth occupancy can be defined as the radio frequency bandwidth 512 from RB #2, which is the allocated RB closest to the first edge of the radio frequency band, to RB #16, which is the closest allocated RB to the second edge of the radio frequency band, including the intervening unused RB's labeled as #'s 3, 4, 10, and 14.

It will be appreciated that in some example embodiments, a combination of distribution characteristics can be used to select the A-MPR value to apply. For example, in some embodiments, the transmission power control module 418 can be configured to look up the proximity to the band edge of an allocated RB that is closest to the band edge for the given allocation ratio in a first data structure in order to access a sub-data structure, such as a sub-table. The sub-table can store associations between A-MPR values and possible total spectrum bandwidth occupancies for the given combination of the RB allocation ratio and the proximity to the band edge of the allocated RB that is closest to the band edge. The transmission power control module 418 can accordingly look up the total radio frequency spectrum bandwidth occupancy for an allocated subset of RB's in the sub-data structure to determine the A-MPR value to apply. It will be appreciated that other combinations of distribution characteristics and/or alternative arrangements of data within the data structure(s) can be applied in a similar manner within the scope of the disclosure.

In some example embodiments, an A-MPR value for each possible pattern of allocated RB's can be maintained in the data structure(s), such that there can be a one-to-one mapping between each possible RB allocation pattern for a given allocation ratio and a respective A-MPR value to apply. For example, with reference to the graph of FIG. 2, each data point on the graph can be individually maintained in a data structure in accordance with some example embodiments. In such example embodiments, the transmission power control module 418 can accordingly be configured to determine and look up the RB allocation pattern of the allocated subset of RB's and determine the associated A-MPR value.

In some example embodiments, the data structure(s) can have a higher level of granularity so as to reduce the memory footprint of the data structure(s), e.g., contain fewer than all possible RB allocation patterns. In this regard, one or more distribution characteristics that can be used as lookup keys in the data structure(s) can represent a plurality of RB allocation patterns, such as a range of RB allocation patterns. For example, an A-MPR value can be maintained for a range of proximities of the closest allocated RB to the edge of the frequency band. For example, given a 20 MHz radio frequency band that includes a total of one hundred RB's, a first A-MPR value can be stored for a situation in which the closest RB to the band edge is between zero and nine RB slots away from the band edge, a second A-MPR value can be stored for a situation in which the closest RB to the band edge is between ten and nineteen RB slots away from the band edge, a third A-MPR value can be stored for a situation in which the closest RB to the band edge is between twenty and twenty-nine RB slots away from the band edge, and so on. For each such range of distribution characteristics, the worst case A-MPR value for the RB allocation distribution pattern falling within that range can be maintained. Accordingly, improvements in the link budget for uplink transmissions compared to an application that uses the overall worst-case scenario for a given RB allocation ratio, e.g., as discussed with respect to the first curve fit line 202 of FIG. 2, can still be made while satisfying the Additional Spectrum Emission Mask; however, the size of the data structure(s) maintaining the A-MPR values can be limited by keying according to ranges of distribution characteristics. It will be appreciated that the size of distribution characteristic ranges can be varied to provide various levels of granularity depending on a desired size of the data structure(s). For example, in embodiments in which at least a portion of the data structure(s) is maintained on a memory of a cellular baseband chip, the size of the cellular baseband memory can limit the size of the data structure(s). Further, it will be appreciated that ranges having various levels of granularity can be applied for any distribution characteristic, including, for example, total radio frequency spectrum bandwidth occupancy, in addition to or in lieu of ranges of the proximity of the closest allocated RB to the band edge. In some embodiments, a data structure can include a set of particular RB allocation patterns that can require the highest levels of transmit power back off, e.g., referring to FIG. 2, those RB allocation patterns that correspond to values at or above the second curve fit line 204, and subset of RB allocation patterns for those RB allocation patterns at or below the second curve fit line 204. The RB allocation patterns that require the highest levels of transmit power back off are sparse at or above the second curve fit line 204 and dense below the second curve fit line 204, and thus memory storage for the data structure can be more efficiently used by using subsets of RB allocation patterns for the denser areas of the graph 200 indicated in FIG. 2, while using a full set of RB allocation patterns for the sparser areas of the graph 200. The representative RB allocation pattern illustrated by graph 200 shown in FIG. 2 is not intended to be limiting, and other plots can be considered that include different regions for which coarser or finer divisions of the RB allocation ratio patterns can be used.

Figure 6:
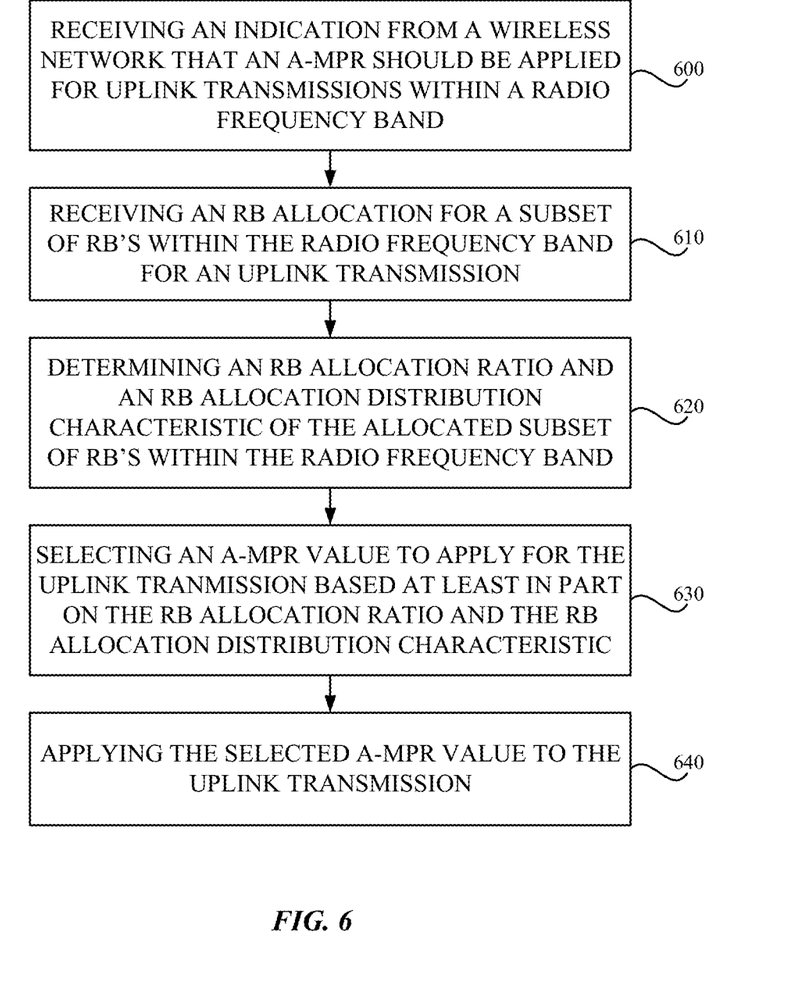
FIG. 6 illustrates a flowchart according to a representative method for dynamically selecting an A-MPR value to apply to an uplink transmission, in accordance with some embodiments.

FIG. 6 illustrates a flowchart according to an example method for a wireless communication device to dynamically select an A-MPR value to apply to an uplink transmission in accordance with some example embodiments. In this regard, FIG. 6 illustrates operations that can be performed by a wireless communication device, such as wireless communication device 302, in accordance with some example embodiments. One or more of processing circuitry 410, processor 412, memory 414, wireless communication interface 416, or transmission power control module 418 can, for example, provide means for performing one or more of the operations illustrated in and described with respect to FIG. 6.

Operation 600 can include the wireless communication device 302 receiving an indication from a wireless network that an A-MPR should be applied for uplink transmissions within a radio frequency band. The received indication can, for example, comprise an NS value that can be signaled by the wireless network, e.g., in a broadcast message or in a specific message sent to the wireless communication device 302. The wireless communication device 302 can use the NS value to determine an Additional Spectrum Emission Mask that should be satisfied through application of the A-MPR. In embodiments in which the wireless communication device 302 maintains separate data structures for respective NS values and/or Additional Spectrum Emission Masks, the wireless communication device 302 can also select an appropriate data structure of A-MPR values, from which to determine and select an A-MPR value to apply based at least in part on the signaled NS value.

Operation 610 can comprise the wireless communication device 302 receiving an RB allocation for a subset of RB's within the radio frequency band to use for an uplink transmission. In some example embodiments, such as some embodiments in which the system 300 comprises a cellular network using a LTE RAT, the RB allocation can be received on the physical downlink control channel (PDCCH).

Operation 620 can include the wireless communication device 302 determining an RB allocation ratio and one or more RB allocation distribution characteristics of the allocated subset of RB's within the radio frequency band. It will be appreciated that any RB allocation distribution characteristic or combination of RB allocation distribution characteristics can be determined in operation 620. For example, operation 620 can comprise determining an exact RB allocation pattern of the allocated subset of RB's, a proximity to an edge of the radio frequency band of a closest allocated RB to the edge (e.g., as illustrated in and described with respect to FIG. 5A), a total radio frequency spectrum bandwidth occupancy of the allocated subset of RB's (e.g., as illustrated in and described with respect to FIG. 5B), some combination thereof, or the like.

Operation 630 can include the wireless communication device 302 selecting an A-MPR value to apply to the uplink transmission based at least in part on the RB allocation ratio and the one or more RB allocation distribution characteristics that can be determined in operation 620. For example, operation 630 can include looking up the RB allocation ratio and the RB allocation distribution characteristic(s) in a data structure to determine an A-MPR value having a defined association with the combination of the RB allocation ratio and the RB allocation distribution characteristic(s). Operation 640 can include the wireless communication device 302 applying the selected A-MPR value to the uplink transmission.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting: such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for dynamically selecting Additional Maximum Power Reduction (A-MPR) values to apply for an uplink transmission by a wireless communication device, the method comprising:
at the wireless communication device:
receiving an indication from a wireless network that an A-MPR value should be applied for uplink transmissions within a radio frequency band used for communication between the wireless communication device and the wireless network;
receiving from the wireless network a Resource Block (RB) allocation for a subset of available Resource Blocks (RBs) within the radio frequency band for the uplink transmission;
determining an RB allocation ratio and an RB allocation distribution characteristic of the allocated subset of RBs within the radio frequency band;

selecting the A-MPR value to apply for the uplink transmission from a data structure stored by the wireless communication device based at least in part on the RB allocation ratio and the RB allocation distribution characteristic; and applying the selected A-MPR to the uplink transmission, wherein:

the data structure is organized based at least in part on the RB allocation ratio and the RB allocation distribution characteristic, for each RB allocation ratio, the data structure includes a complete set of all A-MPR values corresponding to RB allocation patterns for a sparse region above a corresponding curve fit threshold and a subset of all A-MPR values corresponding to RB allocation patterns for a dense region at or below the corresponding curve fit threshold, and the subset of A-MPR values for the dense region is determined based on ranges of proximities between allocated subsets of RBs and band edges of the radio frequency band.

2. The method of claim 1, wherein the RB allocation ratio comprises a ratio of RBs allocated to the wireless communication device to a total number of RBs available for transmission in the radio frequency band.

3. The method of claim 1, wherein the RB allocation distribution characteristic comprises a proximity of one band edge of the radio frequency band to an allocated RB of the subset of available RBs that is closest to the one band edge.

4. The method of claim 1, wherein at least one proximity range of the ranges of proximities upon which the subset of A-MPR values for the dense region are determined comprises numbers of available RBs between one edge of the radio frequency band and a closest allocated RB.

5. The method of claim 1, wherein the RB allocation distribution characteristic comprises a total radio frequency spectrum bandwidth occupancy of the allocated subset of RBs, the total radio frequency spectrum bandwidth occupancy being defined as a radio frequency bandwidth from an allocated RB closest to a first edge of the radio frequency band to an allocated RB closest to a second edge of the radio frequency band, including any non-allocated RBs between the allocated RBs closest to the first and second edges of the radio frequency band.

6. The method of claim 1, further comprising:
at the wireless communication device:
storing the data structure defining a respective A-MPR value to apply for each of a plurality of RB allocation ratio and RB allocation distribution characteristic combinations; and
selecting the A-MPR value to apply for the uplink transmission comprises obtaining a combination of the RB allocation ratio and the RB allocation distribution characteristic from the data structure to determine the A-MPR value associated with the combination of the RB allocation ratio and the RB allocation distribution characteristic.

7. The method of claim 1, wherein:
receiving the indication from the wireless network that the A-MPR value should be applied comprises receiving a Network Signaling (NS) value from the wireless network, the NS value specifying an additional radio frequency spectrum emission mask to apply within the radio frequency band; and
selecting the A-MPR value further comprises selecting the A-MPR value to satisfy the additional radio frequency spectrum emission mask.

8. The method of claim 1, wherein the wireless network operates in accordance with a Long Term Evolution (LTE) radio access technology.

9. The method of claim 1, wherein the A-MPR value selected by the wireless communication device differs from a network A-MPR value provided by the wireless network in one or more control messages to the wireless communication device.

10. A wireless communication device configurable for dynamically selecting Additional Maximum Power Reduction (A-MPR) values to apply for an uplink transmission, the wireless communication device comprising:

a wireless communication interface configurable to adjust uplink transmissions based on A-MPR values;

processing circuitry comprising one or more processors and memory storing executable instructions, the processing circuitry communicatively coupled with the wireless communication interface; and a transmission power control module communicatively coupled with the processing circuitry, wherein the executable instructions, when executed by the one or more processors, cause the wireless communication device to:

receive from a wireless network a Resource Block (RB) allocation for a subset of available Resource Blocks RBs within a radio frequency band for an uplink transmission;

determine an RB allocation ratio and an RB allocation distribution characteristic of the allocated subset of RBs within the radio frequency band;

select the A-MPR value to apply for the uplink transmission from a data structure stored by the wireless communication device based at least in part on the RB allocation ratio and the RB allocation distribution characteristic; and apply the selected A-MPR to the uplink transmission, wherein:

the data structure is organized based at least in part on the RB allocation ratio and the RB allocation distribution characteristic, for each RB allocation ratio, the data structure includes a complete set of all A-MPR values corresponding to RB allocation patterns for a sparse region above a corresponding curve fit threshold and a subset of all A-MPR values corresponding to RB allocation patterns for a dense region at or below the corresponding curve fit threshold, and the subset of A-MPR values for the dense region is determined based on ranges of proximities between allocated subsets of RBs and band edges of the radio frequency band.

11. The wireless communication device of claim 10, wherein the RB allocation ratio comprises a ratio of RBs allocated to the wireless communication device to a total number of RB's available for transmission in the radio frequency band.

12. The wireless communication device of claim 10, wherein the RB allocation distribution characteristic comprises an actual distribution of the RBs allocated to the wireless communication device across the radio frequency band.

13. The wireless communication device of claim 10, wherein at least one proximity range of the ranges of proximities upon which the subset of A-MPR values for the dense region are determined comprises numbers of available RBs between one edge of the radio frequency band and a closest allocated RB.

14. The wireless communication device of claim 10, wherein the RB allocation distribution characteristic comprises a total radio frequency spectrum bandwidth occupancy of the allocated subset of RBs, the total radio frequency spectrum bandwidth occupancy being defined as a radio frequency bandwidth from an allocated RB closest to a first edge of the radio frequency band to an allocated RB closest to a second edge of the radio frequency band, including any non-allocated RBs between the allocated RBs closest to the first and second edges of the radio frequency band.

15. The wireless communication device of claim 10, wherein execution of executable instructions by the one or more processors, further cause the wireless communication device to:
   store the data structure defining a respective A-MPR value to apply for each of a plurality of RB allocation ratio and RB allocation distribution characteristic combinations; and
   select the A-MPR value to apply for the uplink transmission by obtaining a combination of the RB allocation ratio and the RB allocation distribution characteristic from the data structure to determine the A-MPR value associated with the combination of the RB allocation ratio and the RB allocation distribution characteristic.

16. The wireless communication device of claim 10, wherein:
   the wireless communication device receives an indication from the wireless network that the A-MPR value should be applied by receiving a Network Signaling (NS) value from the wireless network, the NS value specifying an additional radio frequency spectrum emission mask to apply within the radio frequency band; and
   the wireless communication device further selects the A-MPR value by selecting the A-MPR value to satisfy the additional radio frequency spectrum emission mask.

17. The wireless communication device of claim 10, wherein the A-MPR value selected by the wireless communication device differs from a network A-MPR value provided by the wireless network in one or more control messages to the wireless communication device.

18. A non-transitory computer-readable medium storing instructions that, when executed by one or more processors of a wireless communication device, cause the wireless communication device to:
   receive from a wireless network a Resource Block (RB) allocation for a subset of available Resource Blocks RBs within a radio frequency band for an uplink transmission;
   determine an RB allocation distribution characteristic of the allocated subset of RBs within the radio frequency band;
   select an A-MPR value to apply for the uplink transmission from a data structure stored by the wireless communication device based at least in part on the RB allocation distribution characteristic; and
   apply the selected A-MPR to the uplink transmission, wherein:
      the data structure is organized based at least in part on the RB allocation ratio and the RB allocation distribution characteristic,
      for each RB allocation ratio, the data structure includes a complete set of all A-MPR values corresponding to RB allocation patterns for a sparse region above a corresponding curve fit threshold and a subset of all A-MPR values corresponding to RB allocation patterns for a dense region at or below the corresponding curve fit threshold, and
      the subset of A-MPR values for the dense region is determined based on ranges of proximities between allocated subsets of RBs and band edges of the radio frequency band.

19. The non-transitory computer-readable medium of claim 18, wherein execution of the instructions by the one or more processors of the wireless communication device, further cause the wireless communication device to:
   store the data structure defining a respective A-MPR value to apply for each of a plurality of RB allocation ratio and RB allocation distribution characteristic combinations;
   determine an RB allocation ratio of the allocated subset of RBs within the radio frequency band; and
   select the A-MPR value to apply for the uplink transmission by obtaining a combination of the RB allocation ratio and the RB allocation distribution characteristic from the data structure to determine the A-MPR value associated with the combination of the RB allocation ratio and the RB allocation distribution characteristic.

20. The non-transitory computer-readable medium of claim 18, wherein the RB allocation distribution characteristic comprises a bandwidth between one band edge of the radio frequency band and a closest allocated RB.

* * * * *